Oct. 26, 1954   P. W. DOUGLAS   2,692,681
CENTRIFUGE SUPPORT
Filed Dec. 16, 1949   2 Sheets-Sheet 2
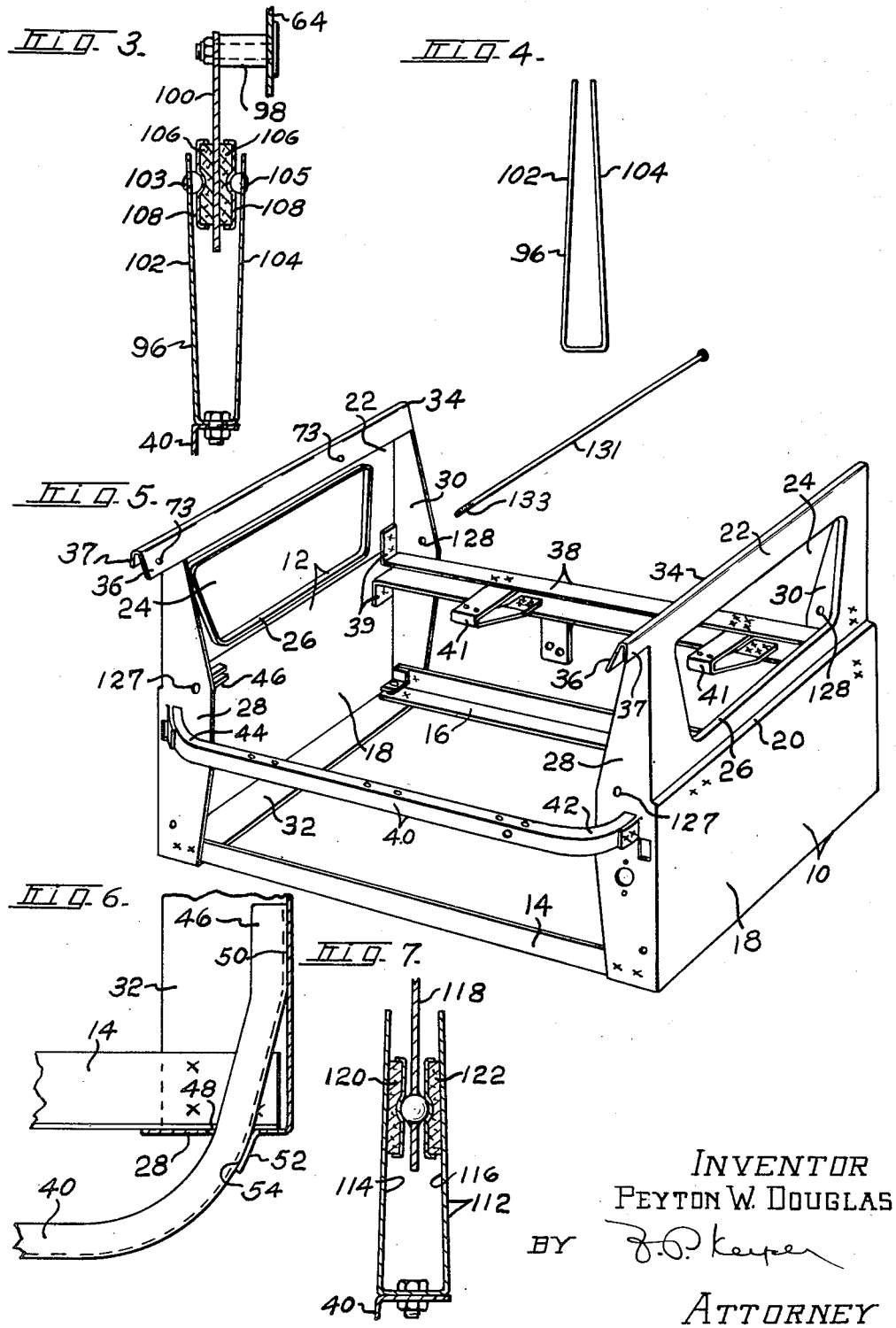
INVENTOR
PEYTON W. DOUGLAS
BY
ATTORNEY Patented Oct. 26, 1954

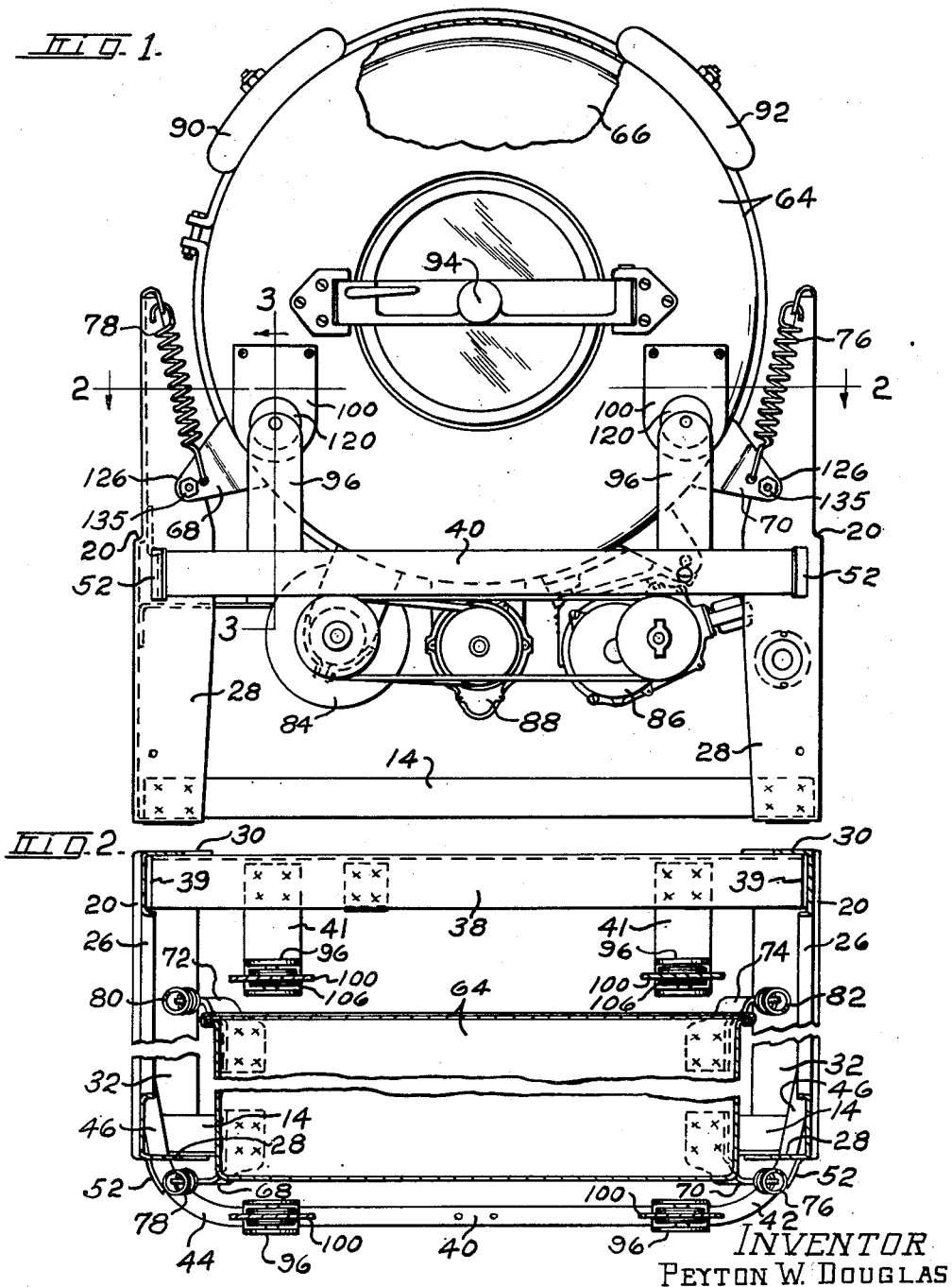

2,692,681

UNITED STATES PATENT OFFICE 2,692,681

CENTRIFUGE SUPPORT

Peyton W. Douglas, Syracuse, N. Y., assignor to Easy Washing Machine Corporation, Syracuse, N. Y., a corporation of Delaware Application December 16, 1949, Serial No. 133,445

3 Claims. (Cl. 210—63)

This invention relates to washing machines, and more particularly to machines adapted for centrifugal extraction and a mounting therefor.

In an application Serial No. 775,237, filed September 20, 1947, now Patent Number 2,637,189, there is shown a cylinder type washing machine in which centrifugal extraction is effected following the usual washing and rinsing operations. In machines of such type, difficulty is encountered in evenly distributing the laundry within the cylinder prior to centrifugal extraction, with the result that upon rotating the drum at extracting speeds, considerable vibration may result, and such vibration is transmitted to the supporting structure.

Since a drum having an unbalanced load will, upon rotating at high speed, tend to rotate about its center of mass, it is desirable that the drum be substantially freely suspended for relatively free movement, to substantially prevent vibration at high speeds from being transmitted to the supporting structure. However, upon accelerating an unbalanced load, there is a critcal speed at which an unbalanced mass tends to produce severe vibrations or oscillations of wide amplitude, and a relatively free suspension will not be effective to confine the movement of the drum during such critical oscillations within reasonable limits.

It is an object of the present invention to provide in a centrifugal extracting machine of the type described, a relatively free resilient suspension in which there is provided damping means between the base and unit effective to limit the range of movement of the unit, particularly at the critical speeds. A further object of the invention is to provide a damping means for an apparatus of the type described, wherein friction damping is provided effective in a plane substantially at right angles to the normal axis of rotation of the drum and in which the damping means tends to resiliently hold the movement of the drum to movement in planes transverse to the normal drum axis. Another object of the invention is to provide a resilient suspension and damping means of the type described which will be effective, and yet rugged and economical of manufacture. A further object of the invention is to provide a relatively free resilient support and damping means, quadrilaterally disposed to provide a broad support base. A still further object of the invention is directed to a supporting frame so constructed and arranged as to particularly accommodate the suspension and damping means of the invention. Yet a further object of the invention is to provide a resilient suspension and frame combination, which may be rigidly and economically tied together for shipping purposes.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, in which like reference characters indicate like parts:

Figure 1 is a front elevation of the washing machine showing the forward suspension and damping elements;

Figure 2 is a horizontal section taken on the line 2—2 of Figure 1, showing the arrangement of forward and rearward suspension and damping elements;

Figure 3 is a sectional view taken on the line 3—3 of Figure 1, showing a damping element;

Figure 4 is an elevational view of the resilient element of the damping device;

Figure 5 is a perspective view of the supporting frame;

Figure 6 is a horizontal sectional detail of the frame; and

Figure 7 is a sectional view of an alternative damping device.

Referring to Figures 1, 2 and 5 of the drawings, there is shown a frame construction comprising box end sections in the form of flanged end plates 10 and 12 and connecting forward and rearward base angle irons 14 and 16. Each end plate or panel comprises a single stamping of relatively heavy gauge sheet metal, the same having a lower rectangular cabinet face area 18 bounded along the upper edge thereof by an offset 20 from which upwardly extends a supporting frame portion 22. The frame portion has a window 24 struck therein bounded by a stiffening marginal flange 26. The front and rear edges of each end plate are formed at right angles into forward and rearward relatively wide stiffening flanges 28 and 30, and the lower marginal edge of the cabinet supporting face area 18 is turned in as at 32, also for stiffening purposes. A cabinet structure resting upon and extending upward from the offset 20 may cooperate with the face area 18 to form an enclosure.

The upper edge of the frame 22 is bent inwardly as at 34 and downwardly as at 36, to form in effect an integral channel member of substantial stiffness and from which the washing unit may be suspended. Such channel member extends forwardly of the flange 28 as at 37. The angle irons 14 and 16 are suitably secured as by spot welds to the stiffening flanges 28 and 30 and ends of the turned in lower edge portion 32. The end members are additionally strengthened by a rear longitudinally extending channel member 38 extending between the end members and secured to the rear flanges 30, the channel having tongues 39 secured to the respective face areas 18 of the end plates, all preferably by welding. A forward channel member 40 extends lengthwise of the frame forward of the end members 10 and 12, the channel member 40 being curved at its ends as at 42 and 44 to provide rearwardly projecting ends 46 adapted to extend through suitable apertures 48 struck in each of the flanges 28, the ends being secured to the end plates 10 and 12 as at 50. The apertures 48 are formed by striking a tongue member 52 from the metal of the flanges 28, which tongue member is adapted to be secured to the web of the channel member 40 as at 54. The channel member will preferably be secured to the end members at 50 and 54 by spot welding or other suitable means.

It will be seen from the foregoing that the end members, with their flanges extending along two sides and the bottom and the channel member formed along the upper edge together with the offset and stiffened window, provide relatively rigid members which when connected by the tie or angle members 14 and 16 and channels 38 and 40, produces a solid base structure capable of rigidly supporting a load which may be of vibrational character. At the same time, the end plates may be similar stampings from sheet stock, rights and lefts being formed by secondary operations in which rearward projecting material forming projections 37 are removed and apertures 48 struck in the forward flanges 28.

The washing unit comprises a drum-like supporting shell 64 within which is a washing cylinder 66 adapted to rotate upon a substantially horizontal axis. The shell is supported by front bracket members 68 and 70, rearward bracket members 72 and 74, and coil springs 76, 78, 80 and 82 extending upwardly to holes 73 punched in the inside flanges 36 of the channel members formed along the upper edge of the side members 10 and 12. The coil springs are preferably of substantially uniform strength and characteristics, and are so positioned with respect to the washing unit as to normally support the same in a horizontal position. The springs are also as widely spaced as practical, both in an axial direction as well as longitudinally, to provide as large a quadrilateral whose recatngular dimensions are large as compared to the normal deflection of the springs. The springs thereby tend to support the load in horizontal relation, notwithstanding variations in loading axially within the cylinder.

The shell 64 of the washing unit may carry on its bottom wall a driving motor 84, a transmission 86 and other apparatus such as a pump 88, and on its top wall suitable weights 90 and 92 may be utilized if desired, and be so positioned and selected as to provide a substantially uniform mass concentration of the whole unit about the rotational center 94 of the washing and extractor drum 66. The weights will also be arranged substantially in the plane of the weight of the motor 84 and transmission 86, and such plane will pass through the center region of the washing and extractor drum in order to substantially uniformly load the springs.

It will be seen that the frame thus provides a support for the unit providing adequate clear space beneath the washing unit for the driving motor and transmission, and that a substantial range of movement of the unit within the frame may take place without the frame or unit contacting during critical period oscillations of wide amplitude.

In order to dampen the movement of the washing unit and at the same time yieldingly confine its movement to substantially rectilinear movement about the axis of rotation of the drum, interleaved friction member units are provided at the front and rear of the apparatus, the units being quadrilaterally disposed adjacent the springs for uniform effectiveness. Each friction unit comprises a double bent resilient U member 96 supported by the channel members 40 and 38, brackets 41 being provided therefor on channel member 38. Cooperating with the U members are bracket members 98 secured to the wall of the shell 64, the bracket members each having a plate extension 100 interleaved between the resilient side members 102 and 104 of the double bent U members 96. The plane of the plate extension lies perpendicular to the drum rotation axis. Frictionally engaging the plate 100 on opposite sides are friction blocks 106 contained within flanged cup members 108 having universal means comprising a central depression swivelly mounted upon ball end studs 103 and 105 secured to the side members 102 and 104. The resilient side members 102 and 104 are sprung apart to accommodate the friction blocks and thereby provide the desired pressure between the friction surfaces. It will be seen that upon relative movement taking place between the washing unit and the frame, the friction members rub upon the plate 100, and tend to damp the vertical or sidewise movement of the unit as a whole, but that should any movement of the washing unit take place in a fore and aft direction, the resiliency of the members 102 and 104 combine to react against such movement and urge the unit to move in planes perpendicular to the normal position of the axis 94 without fore and aft movement. The friction units, being quadrilaterally disposed and adjacent the similarly disposed spring supports, directly coact with the respective adjacent springs to the end that movement of the washing unit other than rectilinear is effectively resisted, while the amplitude of the oscillations at the critical speed is controlled.

In operation, the laundry contained within the drum 66 is distributed around the drum by accelerating the rotation speed of the drum from a tumbling speed. As the speed increases, the laundry distributes itself around the drum and such distribution is held by centrifugal force as speed is increased. Such distribution may be reasonably uniform, but will not necessarily result in a balanced condition. Any unbalance will likely lie centrally of the axial length of the drum, and cause gyratory movement of the unit. A severe unbalance will result in vibrations of wide amplitude when passing through the critical speed, and the damping devices act to damp the amplitude to a range of movement within the wide clearance provided between the unit and frame by the construction set forth. When the unbalance does not lie centrally of the drum axis, the twisting movements resulting are resisted by the resiliency of members 102 and 104. Rectilinear movement is thus permitted, subject only to a degree of damping, while twisting movements are resiliently resisted. The frame itself is thus capable of supporting the unit with its unbalanced load without the necessity of being secured to a heavy base block or to a floor as has previously been found preferable in apparatus of the general character described.

The friction devices will be seen to be relatively simple, being composed of stamped members with readily replaceable disks of friction lining coacting with one of the members to provide the necessary effect. In Figure 7, an alternative arrangement is shown wherein the double bent member 112 acts to provide friction surfaces 114 and 116, and in which the unit carried bracket member 118 swivelly supports the friction blocks 120 and 122. In either event, the bracket member 96 or 112 is composed of resilient material and is so sprung in assembling the parts as to provide the desired pressure upon the friction damping surfaces.

With the frame and unit thus constructed, effective means for locking the frame and unit against relative movement during shipment may be conveniently provided. The brackets 68, 70, 72 and 74 are extended as at 126 in overlying relation to the flanges 28 and 30, so that by providing aligned apertures 127 and 128 in the flanges 28 and 30 and in each of the brackets 68, 72, 70 and 74, respectively, on either side, locking bars such as 131 may be inserted on either side to rigidly secure the unit in immovable relation to the frame. Such bars 131 may be screw threaded at one end as at 133, and the apertures on the forward brackets 68 and 70 may be provided with threaded sockets 135. The bars may thereby be threaded through the aligned apertures and screwed in place prior to shipment, or readily removed after shipment to restore the resilient suspension.

While the apparatus has been shown in conjunction with a specific frame-supporting construction and a particular type of washing unit, it will be apparent that the resilient support and damping system may be applied to varying constructions, it being preferable that the unit be supported substantially uniformly at its four points of suspension on a relatively broad base, with the weight distributed substantially symmetrical with respect to the resilient supports, and that the damping devices be likewise located all in a substantially symmetrical manner so that the resilient supporting and damping effect at each corner will be substantially uniform and to the end that substantially rectilinear vibratory motion of the unit will result.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a supporting frame for a laundry centrifugal apparatus, end frame members having forward and rear corners having flanges extending from top to bottom, the rear flanges and the forward flanges lying in common vertical parallel planes, and inwardly extending flanges along the bottom edge, forward and rear angle members extending parallel with one another and connecting the forward and rear flanges of the opposite end frame members and the inwardly extending bottom flanges, horizontally extending angle members connecting said opposite forward and rear flanges and lying in an intermediate plane approximately halfway between the top anf bottom of said end frame members, angular stiffening means in said end members extending from front to rear and lying substantially in said intermediate plane, the angle member connecting said forward flanges and lying in said intermediate plane having the form of an elongated forward extending arch, said arch member extending forward of the forward end frame flanges and being secured to the front faces thereof, and inverted channel members extending horizontally from rear to front and forming the upper edge of said end members, said channel members extending forward of the front flanges of said end members, the opposite flanges of each of said channel members embracing the upper ends of the respective forward and rear flanges of said end members.

2. In a supporting frame for a laundry centrifugal apparatus, end frame members having forward and rear corners having flanges extending from top to bottom, the rear flanges and the forward flanges lying in common vertical parallel planes, and inwardly extending flanges along the bottom edge, forward and rear angle members extending parallel with one another and connecting the forward and rear flanges of the opposite end frame members and the inwardly extending bottom flanges, horizontally extending angle members connecting said opposite forward and rear flanges and lying in an intermediate plane approximately half way between the top and bottom of said end frame members, angular stiffening means in said end members extending from front to rear and lying substantially in said intermediate plane, the angle member connecting said forward flanges and lying in said intermediate plane having the form of an elongated forward extending arch, said arch member extending forward of the forward end frame flanges and being secured to the front faces thereof, inverted channel members extending horizontally from rear to front and forming the upper edge of said end members, said channel members extending forward of the front flanges of said end members, the opposite flanges of each of said channel members embracing the upper ends of the respective forward and rear flanges of said end members, and a centrifuge unit having a cylinder member rotating on a fore and aft extending horizontal axis located between said end members, resilient suspension members supporting said unit and suspended from said channel members at four quadrilaterally disposed points forward of each of said corner flanges.

3. In a supporting frame for a laundry centrifugal apparatus, end frame members having forward and rear corners having flanges extending from top to bottom, the rear flanges and the forward flanges lying in common vertical parallel planes, and inwardly extending flanges along the bottom edge, forward and rear angle members extending parallel with one another and connecting the forward and rear flanges of the opposite end frame members and the inwardly extending bottom flanges, horizontally extending angle members connecting said opposite forward and rear flanges and lying in an intermediate plane approximately half way between the top and bottom of said end frame members, angular stiffening means in said end members extending from front to rear and lying substantially in said intermediate plane, the angle member connecting said forward flanges and lying in said intermediate plane having the form of an elongated forward extending arch, said arch member extending forward of the forward end frame flanges and being secured to the front faces thereof, inverted channel members extending horizontally from rear to front and forming the upper edge of said end members, said channel members extending forward of the front flanges of said end members, the opposite flanges of each of said channel members embracing the upper ends of the respective forward and rear flanges of said end members, a centrifuge unit having a cylinder member rotating on a fore and aft extending horizontal axis located between said end members, resilient suspension members supporting said unit and suspended from said channel members at four quadrilaterally disposed points forward of each of said corner flanges, and four damping devices having friction surfaces normal to said axis disposed in the region of each of the suspension members, said devices having a member rigidly attached to said unit and a member in substantial vertical alignment therewith rigidly mounted on one of said horizontally extending angle members.

References Cited in the file of this patent

UNITED STATES PATENTS

| Number | Name | Date |
|---|---|---|
| 1,242,134 | Borgmann | Oct. 9, 1917 |
| 2,047,838 | Smith et al. | July 14, 1936 |
| 2,059,312 | Carlson | Nov. 3, 1936 |
| 2,243,565 | Kimball | May 27, 1941 |
| 2,273,712 | Kottgen | Feb. 17, 1942 |
| 2,296,259 | Breckenridge | Sept. 22, 1942 |
| 2,296,260 | Breckenridge | Sept. 22, 1942 |
| 2,313,984 | Breckenridge et al. | Mar. 16, 1943 |
| 2,318,806 | Sisson et al. | May 11, 1943 |
| 2,334,858 | Beattie | Nov. 23, 1943 |
| 2,343,742 | Breckenridge | Mar. 7, 1944 |
| 2,352,362 | Bassett | June 27, 1944 |
| 2,414,506 | Bowen | Jan. 21, 1947 |
| 2,442,355 | Greenslade | June 1, 1948 |
| 2,526,048 | Russell | Oct. 17, 1950 |

FOREIGN PATENTS

| Number | Country | Date |
|---|---|---|
| 241,462 | Great Britain | Oct. 22, 1925 |
| 842,696 | France | June 16, 1939 |